United States Patent
Miwa

(10) Patent No.: US 7,286,856 B2
(45) Date of Patent: Oct. 23, 2007

(54) CELLULAR TELEPHONE SET CAPABLE OF SELF-PRODUCING DISPLAY ANIMATION AND METHOD OF PRODUCING DISPLAY ANIMATION USED IN SAME

(75) Inventor: Takahiro Miwa, Kanagawa (JP)

(73) Assignee: NEC Corporation, Tokyo (JP)

( * ) Notice: Subject to any disclaimer, the term of this patent is extended or adjusted under 35 U.S.C. 154(b) by 551 days.

(21) Appl. No.: 10/718,696

(22) Filed: Nov. 24, 2003

(65) Prior Publication Data
US 2004/0102226 A1    May 27, 2004

(30) Foreign Application Priority Data
Nov. 27, 2002    (JP) .............. 2002/343144

(51) Int. Cl.
   *H04M 1/00* (2006.01)
   *H04B 1/38* (2006.01)
(52) U.S. Cl. ............ 455/566; 455/550.1; 455/90.2
(58) Field of Classification Search ......... 455/566, 455/567, 550.1, 412.1, 557, 414.1, 90.2 455/575.1; 375/240.24
See application file for complete search history.

(56) References Cited

U.S. PATENT DOCUMENTS

| | | | |
|---|---|---|---|
| 6,931,661 B2 * | 8/2005 | Smith ............ | 725/133 |
| 7,003,040 B2 * | 2/2006 | Yi ............ | 375/240.24 |
| 7,069,003 B2 * | 6/2006 | Lehikoinen et al. ..... | 455/414.2 |
| 2002/0004415 A1 * | 1/2002 | Ito et al. ............ | 455/566 |

(Continued)

FOREIGN PATENT DOCUMENTS

| | | |
|---|---|---|
| CN | 2478297 Y | 2/2002 |
| EP | 0 978 987 A2 | 2/2000 |
| EP | 1 133 104 A2 | 9/2001 |
| GB | 2 348 082 A | 9/2000 |

(Continued)

OTHER PUBLICATIONS

European search Report dated Mar. 22, 2004.

(Continued)

*Primary Examiner*—Tilahun Gesesse
(74) *Attorney, Agent, or Firm*—McGinn IP Law Group, PLLC

(57) ABSTRACT

After consecutive photographing by consecutive photographing function of a camera at step S1 or selecting animation from an album function at step S2, display transit to a self-animation producing screen at step S3. In a display area (#1) on right side of a display screen, picked up images are displayed in thumbnail form, and in a display area (#2), images set for respective frame numbers of the self-animation are displayed in thumbnail form. In the display area (#1), a determination key is depressed in the condition where a cursor is focused on the image, the currently selected image is set in the frame of the self-produced animation. The selected image is displayed in the corresponding frame number of the display area (#2) in thumbnail form.

9 Claims, 7 Drawing Sheets

U.S. PATENT DOCUMENTS

| | | |
|---|---|---|
| 2002/0031262 A1* | 3/2002 | Imagawa et al. ............ 382/190 |
| 2002/0037711 A1 | 3/2002 | Mizutani |
| 2002/0039479 A1 | 4/2002 | Watanabe et al. |
| 2002/0137529 A1* | 9/2002 | Takahashi .................... 455/457 |
| 2003/0050059 A1* | 3/2003 | Tsukamoto ................... 455/426 |
| 2004/0090528 A1* | 5/2004 | Miyamoto ................... 348/207.1 |

FOREIGN PATENT DOCUMENTS

| | | |
|---|---|---|
| JP | 08-314422 | 11/1996 |
| JP | 2000-050204 | 2/2000 |
| JP | 2000-92437 | 3/2000 |
| JP | 2000-106666 | 4/2000 |
| JP | 2000-215322 | 8/2000 |

OTHER PUBLICATIONS

Chinese Office Action dated Apr. 22, 2005 with English Translation.

Japanese Office Action dated Oct. 24, 2006 (with partial English translation).

Japanese Office Action, dated Jul. 25, 2006, with partial English translation.

* cited by examiner

CELLULAR TELEPHONE SET CAPABLE OF SELF-PRODUCING DISPLAY ANIMATION AND METHOD OF PRODUCING DISPLAY ANIMATION USED IN SAME

BACKGROUND OF THE INVENTION

1. Field of the Invention

The present invention relates generally to a cellular telephone set, a setting method of a self-produced animation of consecutively taken pictures used in the same, and a program to be used for the method. More particularly, the invention relates to a function for consecutively taking pictures of a cellular telephone set with a camera.

2. Description of the Related Art

In the recent years, among cellular telephone sets, there are some cellular telephone sets installed digital cameras for transmitting pictures or images picked up by the digital cameras by electronic mails or for storing in own cellular telephone sets to browse as albums.

Among these cellular telephone sets with cameras, there are some installed a consecutive photographing function for consecutively taking pictures by means of the digital camera. The pictures taken by the consecutive photographing function may be displayed as thumbnail images (compressed sample images for browsing images in the pictures for appreciation at a glance) (see Japanese Unexamined Patent Publication No. 2000-215322, particularly pages 4 and 5, FIG. 1, for example), or displayed as animation (see Japanese Unexamined Patent Publication No. 2000-92437, particularly pages 2 to 4, FIG. 1, for example).

In the conventional cellular telephone sets with cameras as set forth above, the pictures or images taken by the consecutive photographing function are taken as a set and are registered as one animation. Therefore, in the conventional cellular telephone set with camera, upon consecutive photographing, low quality pictures due to blurring of picture from an unsteady hold on the camera, can be inherently registered.

Also, in the conventional cellular telephone sets with cameras as set forth above, upon producing a self-produced animation, frame number display screen image and picture selection display screen image are mutually different display screen images to make it difficult to visually appreciate transition of animation frames.

SUMMARY OF THE INVENTION

The present invention has been worked out in view of the drawbacks in the prior art. Therefore, it is an object of the present invention to provide a cellular telephone set, a setting method of a self-produced animation of consecutively taken pictures used in the same and a program to be used for the method, which can easily and visually set animation.

According to the first aspect of the present invention, a cellular telephone set capable of displaying still images on a display screen, displays an image display screen displaying still images in thumbnail form so that contents of images can be seen at a glance and a frame display screen displaying still images selected on the image display screen for animation display per frame number in thumbnail form, simultaneously with each other.

According to the second aspect of the present invention, a self-produced animation setting method of consecutive images of cellular telephone set capable of displaying still image on a display screen, comprises:

step of displaying an image display screen displaying still images in thumbnail form so that contents of images can be seen at a glance; and step of displaying a frame display screen displaying still images selected on the image display screen for animation display per frame number in thumbnail form, simultaneously with display on the image display screen.

According to the third aspect of the present invention, a computer executable program of a self-produced animation setting method of consecutive images of cellular telephone capable of displaying still image on a display screen, comprises:

step of displaying an image display screen displaying still images in thumbnail form so that contents of images can be seen at a glance; and step of displaying a frame display screen displaying still images selected on the image display screen for animation display per frame number in thumbnail form, simultaneously with display on the image display screen.

Namely, in the cellular telephone set with the camera according to the present invention, the self-produced animation can be easily set by setting still images picked up with the consecutive photographing function by means of the digital camera in the animation using the interface in thumbnail form.

As set forth above, in the cellular telephone set with the camera according to the present invention, the frame display screen and the image display screen are simultaneously displayed on the same display screen in thumbnail form for facilitating judgment so that the user may selects the images after consecutively photographing for registering as animation and can easily couple the images in another consecutive photographing. Thus, operability in producing animation can be improved.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention.

Figure 1:
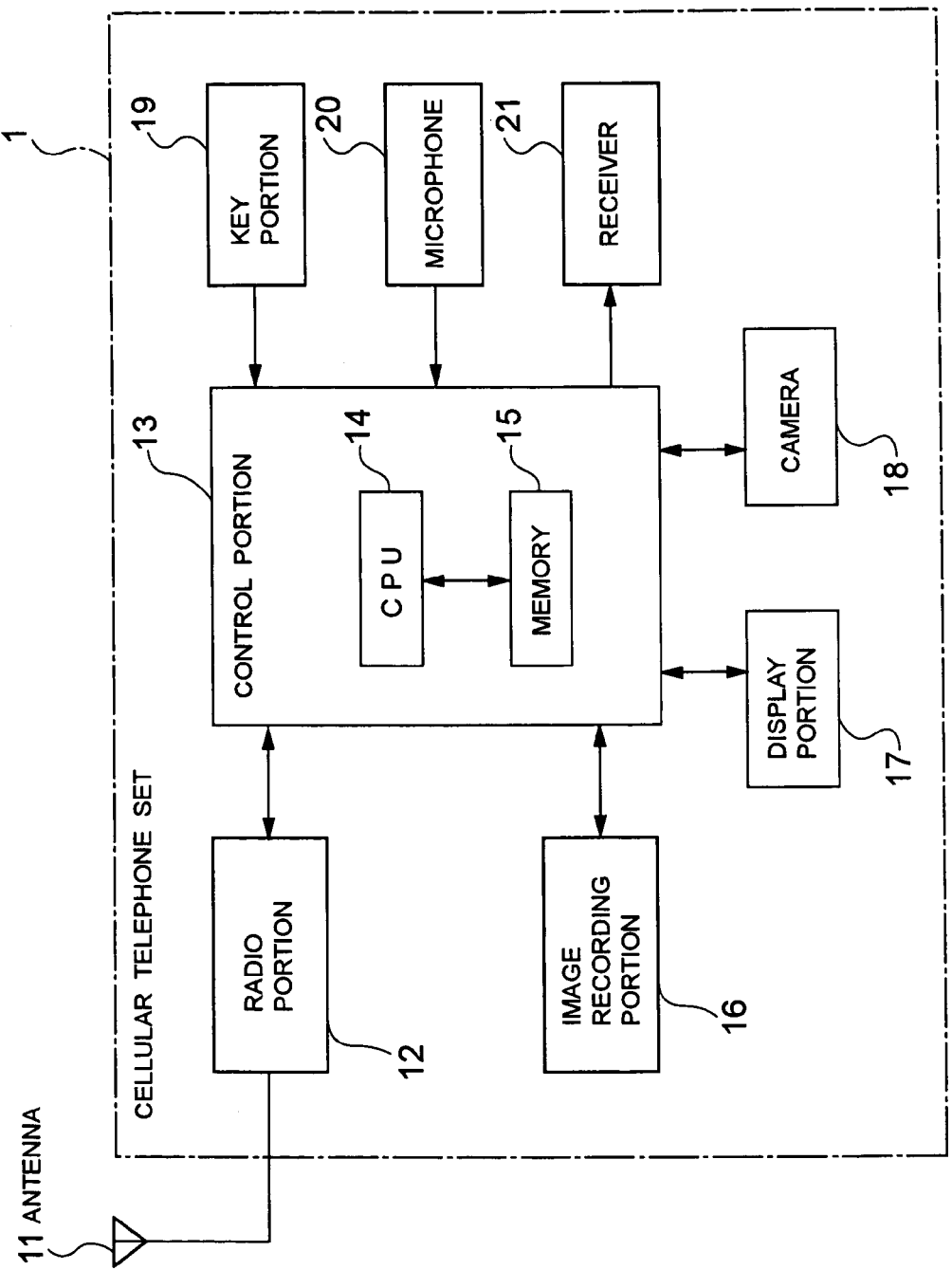
FIG. 1 is a block diagram showing a construction of one embodiment of a cellular telephone set with a camera according to the present invention.

FIG. 1 is a block diagram showing a construction of one embodiment of a cellular telephone set with a camera according to the present invention. In FIG. 1, a cellular telephone set 1 has an antenna 11, a radio portion 12, a control portion 13, an image recording portion 16, a display portion 17, a digital camera (hereinafter referred to as camera) 18, a key portion 19, a microphone 20, a receiver 21. The control portion 13 has CPU (central processing unit) 14 and a memory 15.

A radio signal received by the antenna 11 is demodulated into an electric signal by a radio portion 12. The demodulated electric signal is decoded by the control portion 13 and is parsed whether it is calling signal directed to own cellular telephone set [own ID (identification information)] by CPU 14 in the control portion 13. Ordinary, own ID is stored in the memory 15.

When CPU 14 makes judgment that the received signal is the calling signal to own cellular telephone set, announcement operation of call reception by announcing means of the display portion 17 or the like is performed. When off hook key (corresponding key in the key portion 19) is depressed during announcing, the control portion 13 notifies depression of the off hook key to CPU 14. When depression of off hook key is confirmed, CPU 14 performs call setting response demand to the control portion 13. The call setting response demand is encoded by the control portion 13, modulated by the radio portion 12 and transmitted to a base station (not shown) as a radio signal through antenna 11.

When call setting is completed by the call setting response of CPU 14, calling operation is performed by means of a microphone 20 and a receiver 21. It should be noted that CPU 14 performs the foregoing control by executing a program stored in the memory 15 (program executable by a computer).

The camera 18 is provided with consecutive photographing function. An image recording portion 16 stores images or pictures picked up by the camera 18 (including pictures or images picked up by the consecutive photographing function, images externally input through a not shown interface (for example, images for album or the like), images or the like obtained using electronic mail function).

Figure 2:
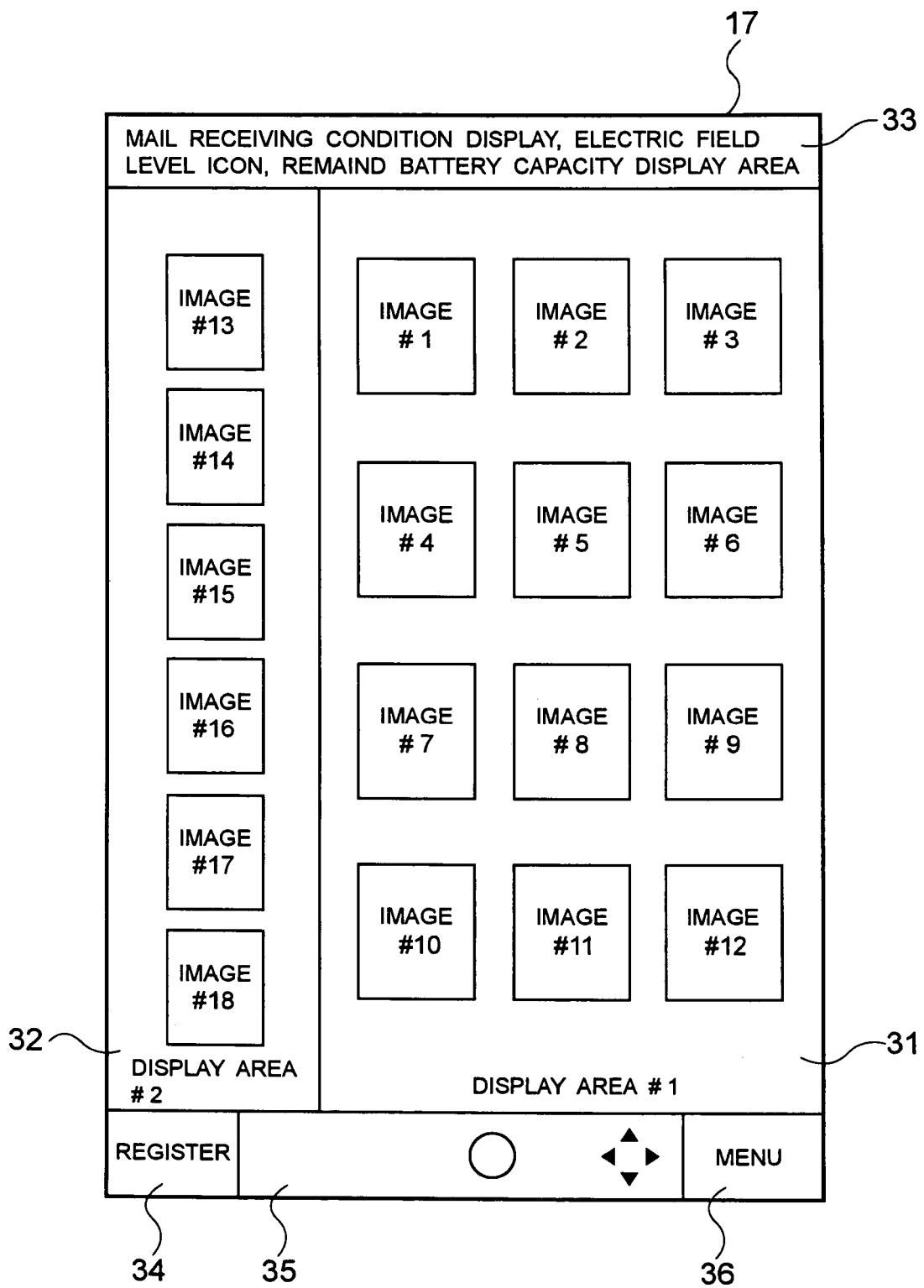
FIG. 2 is an illustration showing a construction of a display screen image of a display portion of FIG. 1.

FIG. 2 is an illustration showing a structure of a display screen image of the display portion 17 of FIG. 1. In FIG. 2, the display screen image of the display portion 17 is consisted of a display area (#1) 31, a display area (#2) 32, a mail received condition indicating display, an electric field level icon (icon of antenna symbol), a remained battery capacity display area 33, a registered key display area 34, a direction key and determination key display area 35 and a menu key display area 36.

Figure 3:
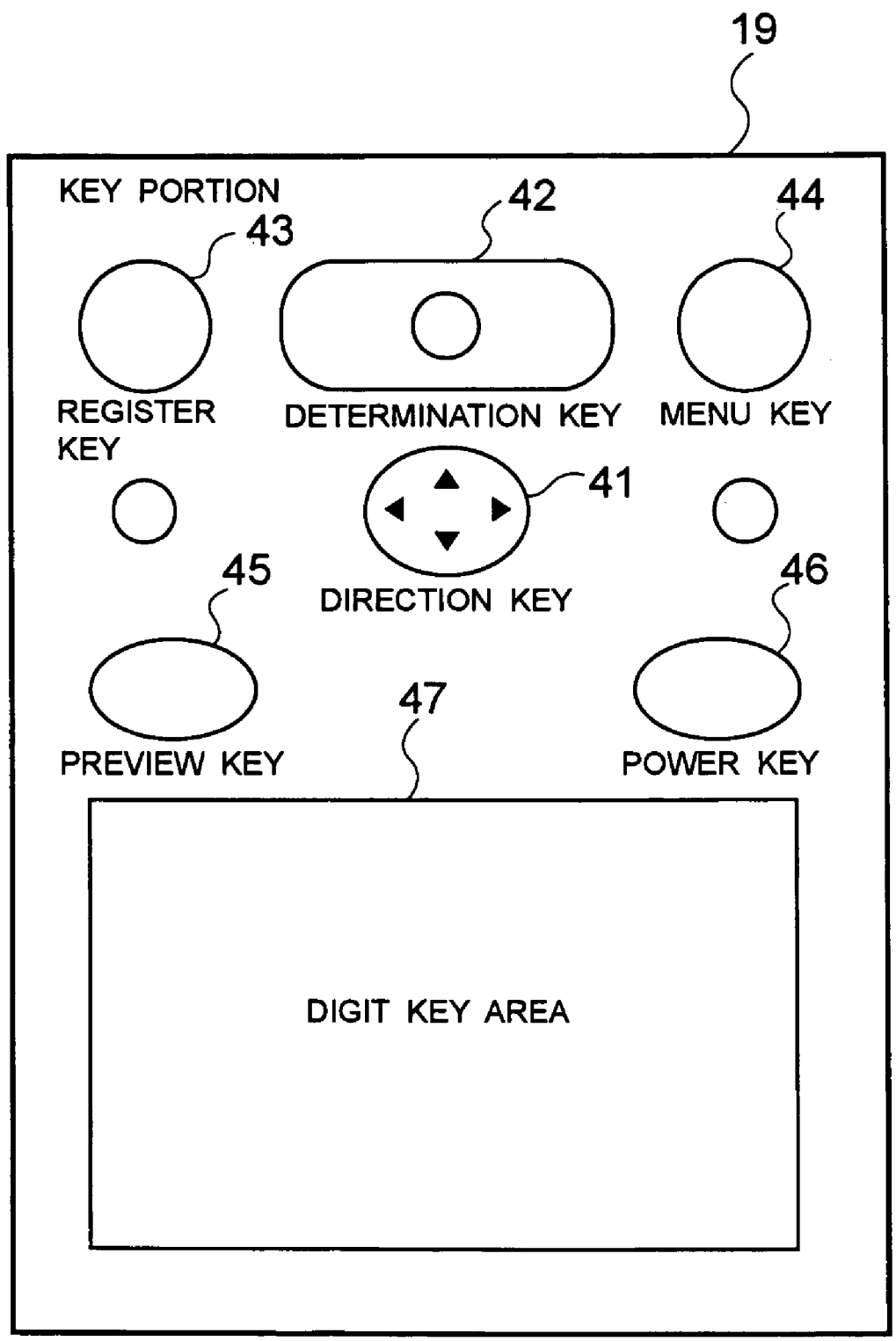
FIG. 3 is an illustration showing a construction of a key portion of FIG. 1.

FIG. 3 is an illustration showing a construction of a key portion 19 of FIG. 1. In FIG. 3, a direction key 41, a determination key 42, a registration key 43, a menu (MENU) key 44, a preview key 45, a power key 46, a digit key area 47 are arranged in the key portion 19.

Figure 4:
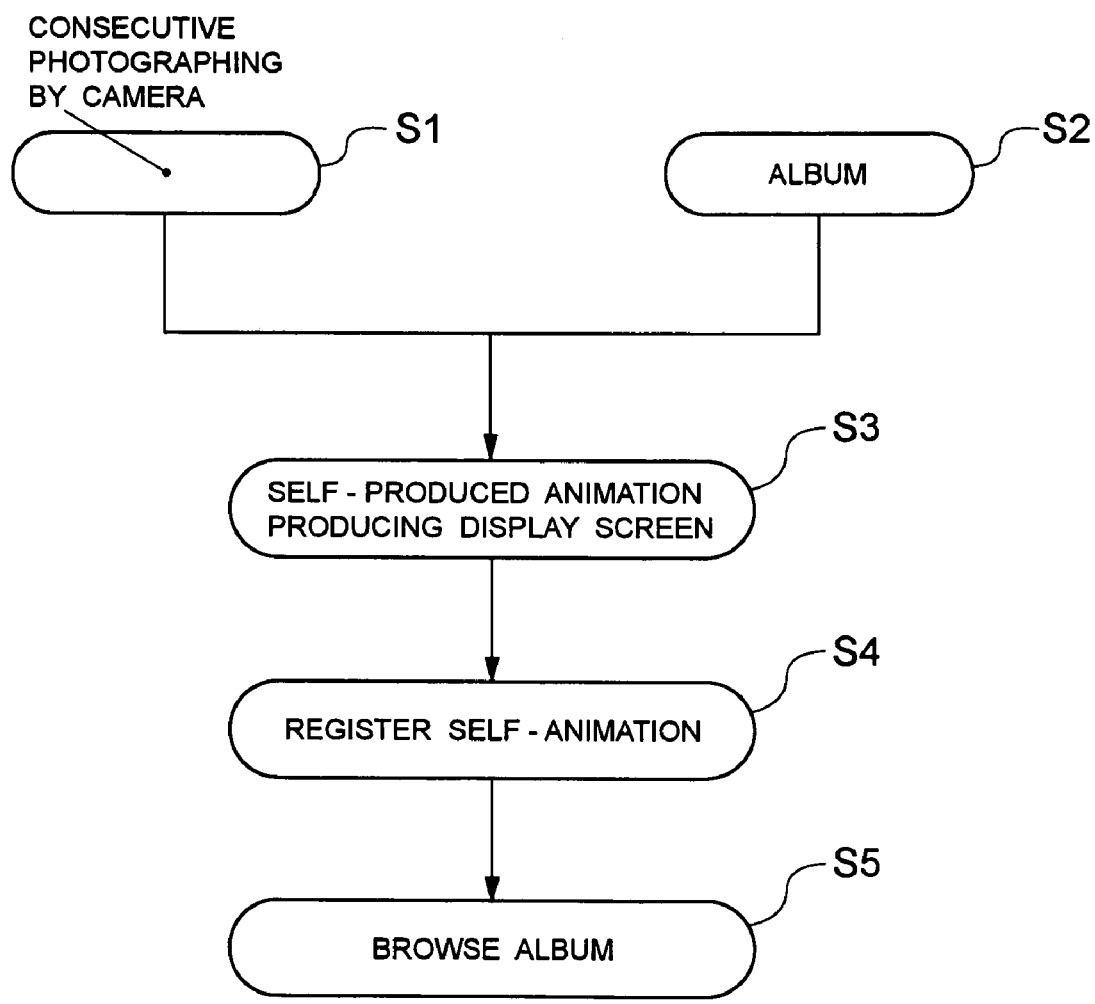
FIG. 4 is an illustration briefly showing one embodiment of a self-produced animation setting method according to the present invention.

FIG. 4 is an illustration briefly showing one embodiment of self-animation setting method according to the present invention. Discussion will be given for one embodiment of self-animation setting method according to the present invention with reference to FIGS. 1 to 4. One embodiment of self-animation setting method according to the present invention is a method for setting animation by selecting images with displaying still images picked up by consecutive photographing function of the camera 18 of the cellular telephone set 1 in thumbnail form (compressed sample images for browsing images in the pictures for appreciation at a glance).

After completion of consecutive photographing by consecutive photographing function of the camera 18 (step S1 of FIG. 4), or by selecting animation from album function [functions for sequentially browsing images (picked up images or the like) stored in the image recording portion 16] (step S2 of FIG. 4), display transits to self-produced animation producing image shown in FIG. 2 (step S3 of FIG. 4).

In FIG. 2, in the display area (#1) on the right side of the display screen, picked up images are displayed in thumbnail form (images #1 to #12). On the other hand, in the display area (#2) 32 in left side of the display screen, images set in respective frame number of the self-produced animation are thumbnail displayed (images #13 to #18).

In the display area (#1) 31, cursor is focused in the currently selecting image. The cursor (not shown) is moved on the display screen of the display portion 17 by the direction key 4 shown in FIG. 3.

On the other hand, in the display area (#1) 31, when the determination key 42 is depressed in the condition where the cursor is focused on the images #1 to #12, the currently selected image (focused image) is set in the frame of the self-produced animation. The images selected as set forth above are thumbnail displayed in the frame numbers (image #13 to image #18) corresponding to the display area (#2) 32.

The frame of the self-produced animation set as set forth above, is registered by depressing the registration key 43. Then, the registered animation is recorded in the image recording portion 16 and can be browsed by album function.

FIGS. 5 to 10 are flowcharts showing operation of one embodiment of the self-produced animation setting method according to the present invention. Discussion will be given for operation of one embodiment of the self-produced animation setting method according to the present invention with reference to FIGS. 1 to 10. The process shown in FIGS. 5 to 10 show process operation from setting of self-produced animation in thumbnail display to browsing. The shown process is realized by executing the program stored in the memory 15 by CPU 14. It should be noted that the self-produced animation in the shown embodiment is operation for sequentially displaying JPEG (Joint Photographic Experts Group) images.

Figure 5:
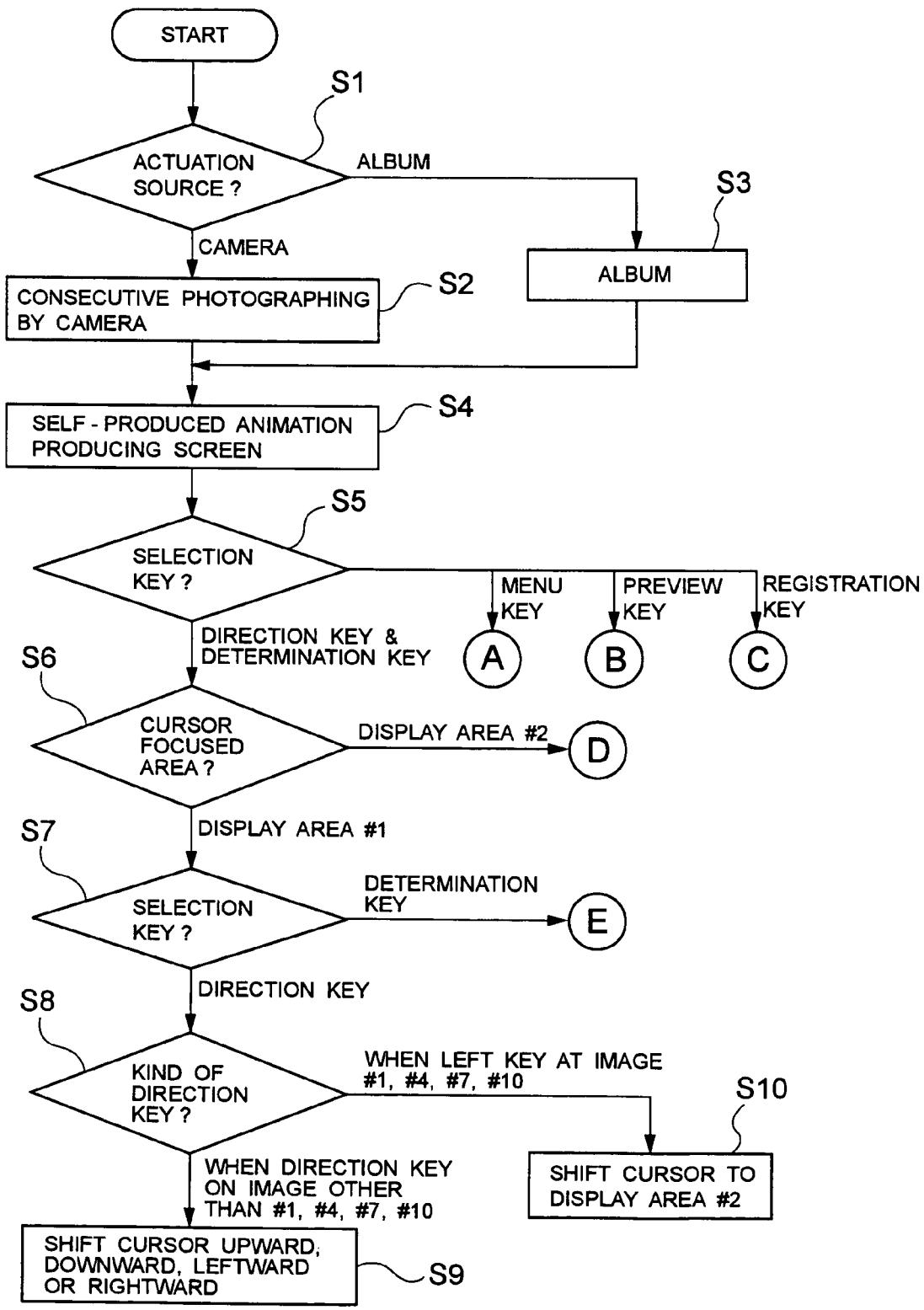
FIG. 5 is a flowchart showing operation of one embodiment of the self-produced animation setting method according to the present invention.

After consecutively photographing in consecutive photographing mode in the camera 18 (steps S1 and S2 of FIG. 5), the display transits to self-produced animation producing display screen image (see FIG. 2) (step S4 of FIG. 5). At this time, number of images which can be consecutively photographed in the consecutive photographing mode in the camera 18, is assumed to be 1 to n (n is natural number).

In the initial display screen image of the self-produced animation producing display screen image, the images (images #13 to #18) after consecutively photographed in the consecutive photographing mode of the camera 18, are displayed in the display area (#1) 31 in thumbnail form. In this case, in the display area, the images after picking up is displayed in the condition set in the frame of animation as default value. The initial position of the cursor is assumed as image #1 of the display area (#1) 31.

Here, concerning operation of cursor, discussion will be given for operation in the display area (#1) 31. The cursor can be operated in respective of upward, downward, leftward and rightward directions by the direction key 41 (steps S5 to S9 of FIG. 5). When the images extend over a plurality of pages, scroll can be made to preceding page and the following page.

Namely, when the up key of the direction key 41 is depressed in the images #1 to #3, preceding image is displayed. When down key of the direction key 41 is depressed in the images #10 to #12, next page is displayed.

Page scroll as set forth above is performed by circulating the page numbers. Upon scrolling from the first (last) page, the last (first) page is displayed. On the other hand, when the left key of the direction key 41 is depressed at the image #1, #4, #7, #10 (steps S5 to S8 of FIG. 5), transition of the cursor can be done from the display area (#1) 31 to the display area (#2) 32 (step S10 of FIG. 5).

Next, discussion will be given for the display area (#2) 32. The cursor can be operation upward, downward, left ward and rightward respectively by means of the direction key 41. When the images extend over a plurality of pages, scroll can be made to preceding page and the following page. Namely, when the up key of the direction key 41 is depressed at the image #13, the preceding page is displayed (steps S5 and 6 of FIG. 5 and steps S16, S18 and S19 of FIG. 9), and when the down key of the direction key 41 is depressed at the image #18, the next page is displayed. Transition from the display area (#2) to the display area (#1) can be performed by depressing right key of the direction key 41 (steps S5 and S6 of FIG. 5 and steps S16, S18 and S20 of FIG. 9).

Subsequently, discussion will be given for operation of the determination key 42. When the cursor is in the display area (#1), the selected image is set in the objective frame set in the display area (#2) 32 by depressing the determination key 42 (steps S21 and S22 of FIG. 10). Then, the set image is displayed in the display area (#2) 32 in thumbnail form.

After selecting images in the frames, image is set in the next frame in the display area (#2) 32, automatically. Therefore, in the display area (#1) 31, next frame can be operated subsequently. At this time, the same image can be set in a plurality of frames. When the cursor is placed in the display area (#2) 32, the frame can be set by depressing the determination key 42 (steps S5 and S6 of FIG. 5, and steps S16 and S17 of FIG. 9).

Figure 7:
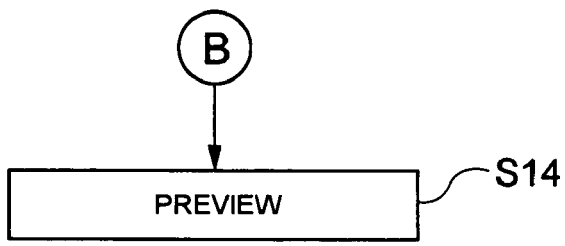
FIG. 7 is a flowchart showing operation of one embodiment of the self-produced animation setting method according to the present invention.

When a preview key 45 is depressed in the display area (#1) 31 or the display area (#2) 32 (step S5 of FIG. 5), full screen display of the image where the cursor is positioned, is performed (step S14 of FIG. 7).

Figure 6:
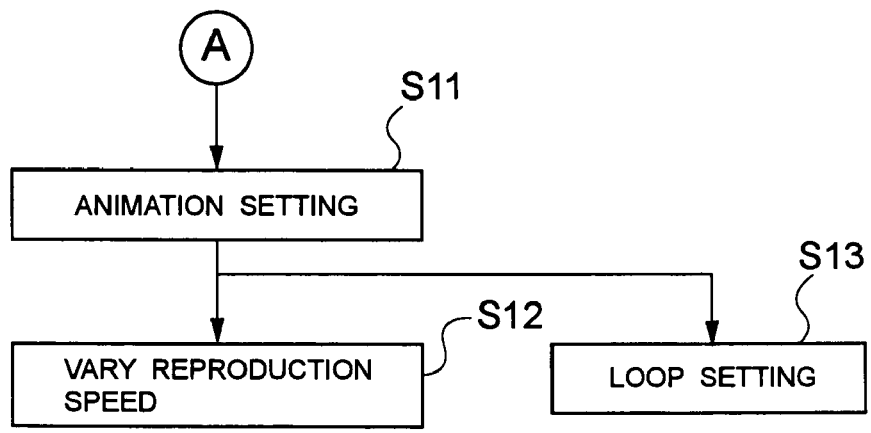
FIG. 6 is a flowchart showing operation of one embodiment of the self-produced animation setting method according to the present invention.

When the menu key 44 is depressed (step S5 of FIG. 5), various setting of animation can be performed (step S11 of FIG. 6). As items of the menu, variation of reproduction speed (step S12 of FIG. 6) and setting of loop (step S13 of FIG. 6Z) can be performed. In variation of the reproduction speed, frame rate of the self-produced animation can be varied so that animation can be displayed at the set reproduction speed upon browsing. In the setting of loop, setting whether repeated reproduction is to be performed or not can be done.

Figure 8:
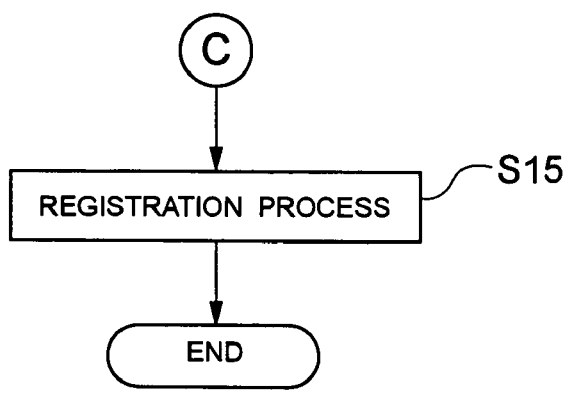
FIG. 8 is a flowchart showing operation of one embodiment of the self-produced animation setting method according to the present invention.
Figure 9:
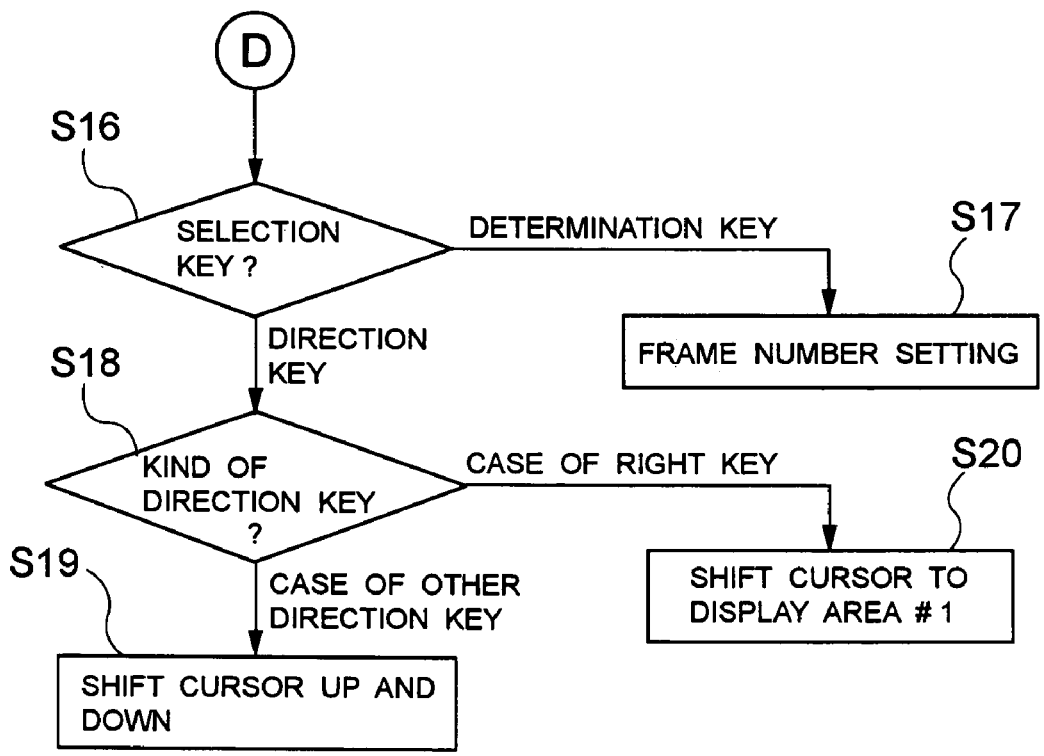
FIG. 9 is a flowchart showing operation of one embodiment of the self-produced animation setting method according to the present invention.
Figure 10:
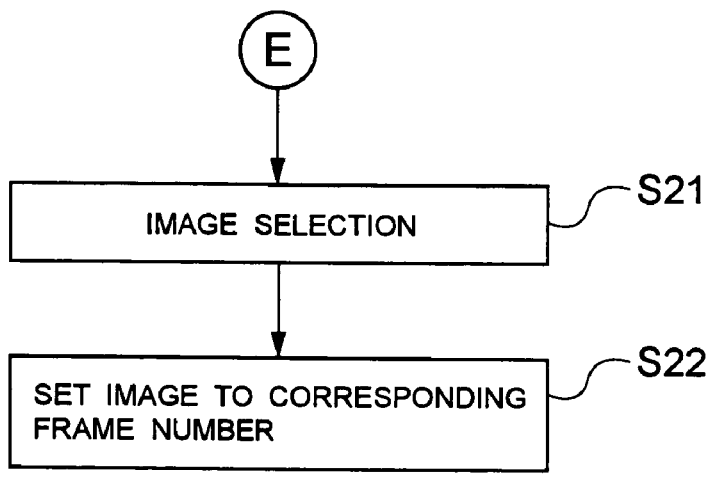
FIG. 10 is a flowchart showing operation of one embodiment of the self-produced animation setting method according to the present invention.

When the registration key 43 is depressed (step S5 of FIG. 5), registration process to the image recording portion 16 of the produced animation is performed (step S16 of FIG. 8). By actuating viewer function in the album, the produced animation can be browsed. On the other hand, the produced animation can be pasted on the waiting screen, telephone calling screen and/or telephone book.

While discussion has been given for transition after consecutive photographing in consecutive photographing mode of the camera 18 in the foregoing process, as alternative transition, actuation from the album storing the picked up images becomes possible (steps S1 and S3 of FIG. 5). In case of album, images in album are displayed in the display area (#1) 31. It should be noted that number of frames to be registered in the self-produced animation is assumed to be 1 to m wherein m≧n.

As set forth above, in the shown embodiment, by setting still images picked up by consecutive photographing function using the camera 18 in animation using the interface in thumbnail form, animation can be visually and easily set.

On the other hand, in the shown embodiment, by selecting images after consecutive photographing by the user, permitting registration in animation, and displaying the frame display screen image [display area (#2) 32] and image display screen image [display area (#1) 31] on the same screen (display screen of the display portion 17) for enabling visual judgment of image by thumbnail display so that images picked up in another consecutively photographed images can be easily coupled, frames of produced self-produced animation can be freely varied to improve operability concerning production of animation.

Furthermore, in the shown embodiment, by depressing the menu key 14 on the display screen of the display portion 17, reproduction speed and/or loop setting of the produced animation can be varied.

In the shown embodiment, the display area (#2) 32 is taken as frame display screen and the display area (#1) 31 as image display screen. However, it is also possible to take the display area (#2) 32 as animation pasting setting area for the waiting screen, telephone book or the like and to select image thumbnail displayed on the display area (#1) 31. Therefore, layout of the display areas and contents of each display area is not specified to those disclosed in terms of the embodiment.

As set forth above, the present invention permits easily and visually setting animation by displaying the still images in thumbnail form so as to see the contents of the images at a glance in an image area of the display screen and displaying the still image selected in the image area in thumbnail form for animation display per frame number in the frame area of the display screen simultaneously with display in the image area, in the cellular telephone set which can display still images on the display screen.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A cellular telephone set capable of displaying still images on a display screen, displaying an image display screen displaying still images in a thumbnail form so that contents of images can be seen at a glance and a frame display screen displaying still images selected on the image display screen for animation display per frame number in a thumbnail form, the image display screen and the frame display screen being displayed simultaneously with each other, wherein said still images comprise still images consecutively picked up by a consecutive photographing function using a digital camera, a plurality of still images consecutively picked up by said consecutive photographing function are displayed in said image display screen, and the still images selected on the image display screen are displayed in said frame display screen and registered as an animation.

2. The cellular telephone set as set forth in claim 1, wherein a reproduction speed of said still images registered as animation is variable.

3. The cellular telephone set as set forth in claim 1, wherein a repeat setting in said still images registered as animation is variable.

4. A self-produced animation setting method of consecutive images of cellular telephone capable of displaying still image on a display screen, comprising:

displaying an image display screen displaying still images in thumbnail form so that contents of images can be seen at a glance; and displaying a frame display screen displaying still images selected on said image display screen for animation display per frame number in a thumbnail form, simultaneously with a display on said image display screen, wherein said still images comprise still images consecutively picked up by a consecutive photographing function using a digital camera, a plurality of still images consecutively picked up by said consecutive photographing function are displayed in said image display screen, and the still images selected on the image display screen are displayed in said image display screen and registered as an animation.

5. The self-produced animation setting method as set forth in claim 4, wherein a reproduction speed of said still images registered as animation is variable.

6. The self-produced animation setting method as set forth in claim 4, wherein a repeat setting in said still images registered as animation is variable.

7. A computer executable program stored in a cellular telephone which, when executed, causes an enactment of a self-produced animation setting method consecutive images of cellular telephone capable of displaying still image on a display screen, said method comprising:

displaying an image display screen displaying still images in a thumbnail form so that contents of images can be seen at a glance; and displaying a frame display screen displaying still images selected on said image display screen for animation display per frame number in a thumbnail form, simultaneously with display on said image display screen;

wherein said still images are still images consecutively picked up by a consecutive photographing function using a digital camera, a plurality of still images consecutively picked up by said consecutive photographing function are displayed in said image display screen, and the still images selected on the image display screen are displayed in said frame display screen and registered as an animation.

8. The program as set forth in claim 7, wherein a reproduction speed of said still images registered as animation is variable.

9. The program as set forth in claim 7, wherein a repeat setting in said still images registered as animation is variable.

* * * * *